(12) United States Patent
Lin et al.

(10) Patent No.: US 6,900,928 B2
(45) Date of Patent: May 31, 2005

(54) METHOD OF PATTERNING AND FABRICATING POLED DIELECTRIC MICROSTRUCTURES WITHIN DIELECTRIC MATERIALS

(75) Inventors: Tze-Chia Lin, Taipei (TW); Tsung-Yuan Chiang, Banchian (TW); Pin-Hao Sher, Tainan (TW); Yen-Hung Chen, Hsinchu (TW); Ming-Hsien Chou, Hsin-Chu (TW)

(73) Assignee: HC Photonics Corporation, Hsin-Chu (TW)

( * ) Notice: Subject to any disclaimer, the term of this patent is extended or adjusted under 35 U.S.C. 154(b) by 266 days.

(21) Appl. No.: 10/100,738

(22) Filed: Mar. 19, 2002

(65) Prior Publication Data

US 2003/0179439 A1 Sep. 25, 2003

(51) Int. Cl.⁷ .......................... G02F 1/355; G02F 1/37; G02F 1/39
(52) U.S. Cl. .................. 359/326; 359/328; 359/330
(58) Field of Search .......................... 359/326–332

(56) References Cited

U.S. PATENT DOCUMENTS

| | | | |
|---|---|---|---|
| 5,193,023 A | 3/1993 | Yamada et al. | 359/245 |
| 5,249,250 A | 9/1993 | Yamada et al. | 385/122 |
| 5,357,533 A | * 10/1994 | Mizuuchi et al. | 372/22 |
| 5,387,998 A | * 2/1995 | Kitaoka et al. | 359/328 |
| 5,519,802 A | 5/1996 | Field et al. | 385/129 |
| 5,526,173 A | 6/1996 | Yamaguchi et al. | 359/328 |
| 5,594,746 A | 1/1997 | Harada | 372/22 |
| 5,615,041 A | 3/1997 | Field et al. | 359/326 |
| 5,652,674 A | 7/1997 | Mizuuchi et al. | 359/326 |
| 5,654,229 A | 8/1997 | Leplingard et al. | 117/56 |
| 5,668,578 A | 9/1997 | Nihei et al. | 346/74.3 |
| 5,734,772 A | 3/1998 | Gopalan et al. | 385/122 |
| 5,744,073 A | 4/1998 | Nihei et al. | 264/1.21 |
| 5,748,361 A | 5/1998 | Gupta et al. | 359/332 |
| 5,756,263 A | 5/1998 | Gupta et al. | 430/317 |
| 5,786,926 A | 7/1998 | Yamada | 359/250 |
| 5,838,702 A | 11/1998 | Byer et al. | 372/21 |
| 5,875,053 A | 2/1999 | Webjorn et al. | 359/326 |
| 5,986,798 A | 11/1999 | Karlsson et al. | 359/326 |
| 5,991,065 A | 11/1999 | Nutt et al. | 359/245 |
| 6,002,515 A | 12/1999 | Mizuuchi et al. | 359/326 |
| 6,156,255 A | 12/2000 | Byer et al. | 264/406 |

OTHER PUBLICATIONS

"Domain Kinetics in the formation of a periodic domain structure in lithium niobate," V.Y. Shur et al., Physics of the Solid State, vol. 41, No. 10, pp. 1681–1687, Oct. 1999.

"Tanable ultraviolet rediction by second–harmonic generation in periodically poled lithium tantalate," J.P. Meyn et al., Optics Letters, vol. 22, No. 16, pp. 1214–1216, Aug. 15, 1997.

"Backswitch poling in lithium niobate for high–fidelity domain patterning and efficient blue light generation," R.G. Batchko et al., Applied Physics Letters, vol. 75, No. 12, pp. 1673–1675, Sep. 20, 1999.

"Domain Inversion in ferroelectric MgO:LiNbO3 by applying electric fields," A. Kuroda et al., Appl. Physics Lett., 69, pp. 1565–1567, Sep. 9, 1996.

"Bulk Periodically Poled MgO–doped LiNbO3 by External Electric Field Application," M. Nakamura et al., Jpn. J. Appl. Phys., vol. 38, pp. L512–L514, May 1, 1999.

(Continued)

*Primary Examiner*—John D. Lee
(74) *Attorney, Agent, or Firm*—George O. Saile; Stephen B. Ackerman; Stephen G. Stanton

(57) ABSTRACT

A method of patterning and fabricating poled dielectric microstructures in dielectric materials comprising the following steps. A poled dielectric microstructure within a dielectric material is provided. The poled dielectric microstructure is then segmented into a plurality of independent sub-structures. The poled dielectric microstructures are then fabricated within each of the plurality of independent sub-structures. Additional processes and a novel poling setup for improving and implementing this patterning and fabrication method are also disclosed.

149 Claims, 8 Drawing Sheets

OTHER PUBLICATIONS

"Bulk periodically poled MgO–LiNbO3 by corona discharge method," A. Harada et al., Appl. Phys. Lett., 69 (18), pp. 2629–2631, Oct. 28, 1996.

"Second harmonic generation in electric poled X–cut MgO–doped LiNbO3 waveguides," S. Sonoda et al., Appl. Phys. Lett., 70 (23), pp. 3078–3080, Jun. 9, 1997.

* cited by examiner

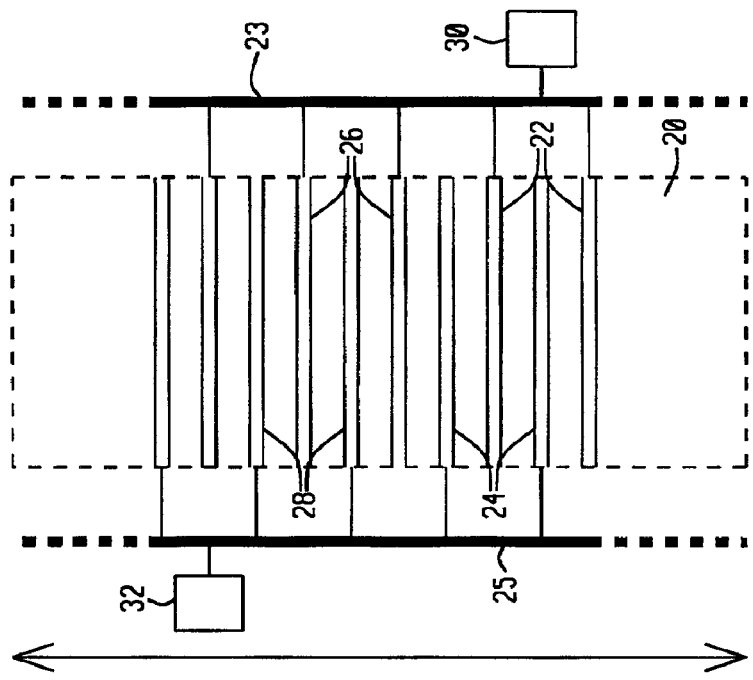
*FIG. 1b*
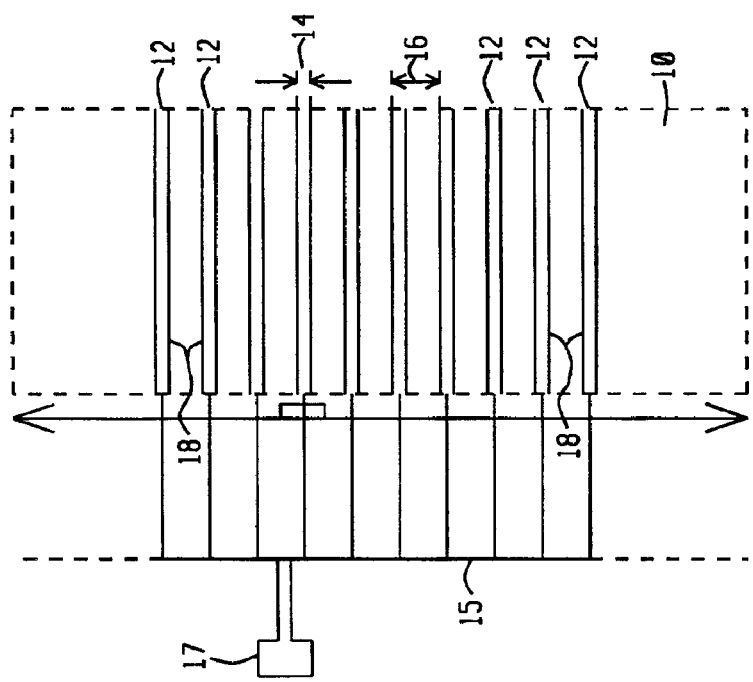
*FIG. 1a –
Prior Art*

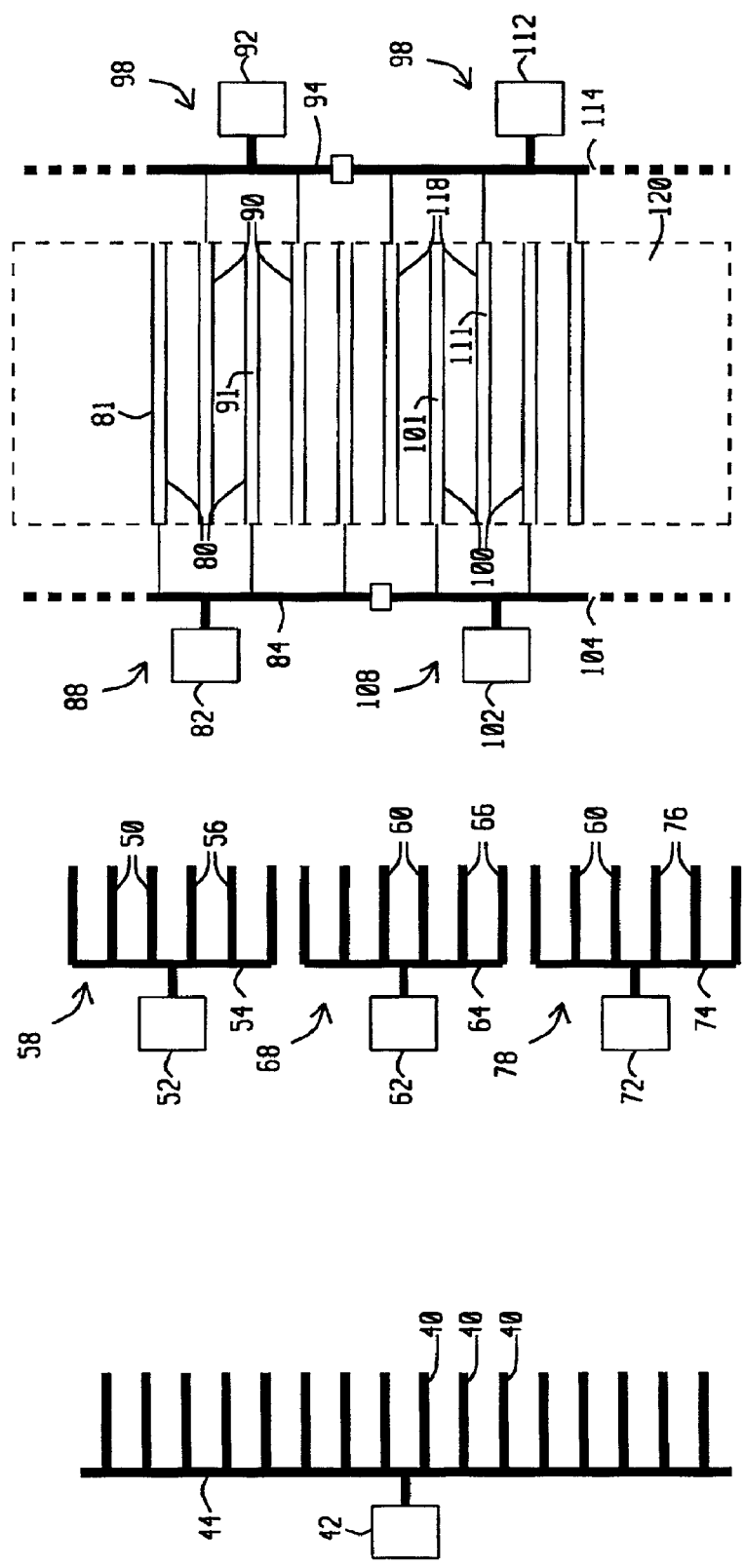

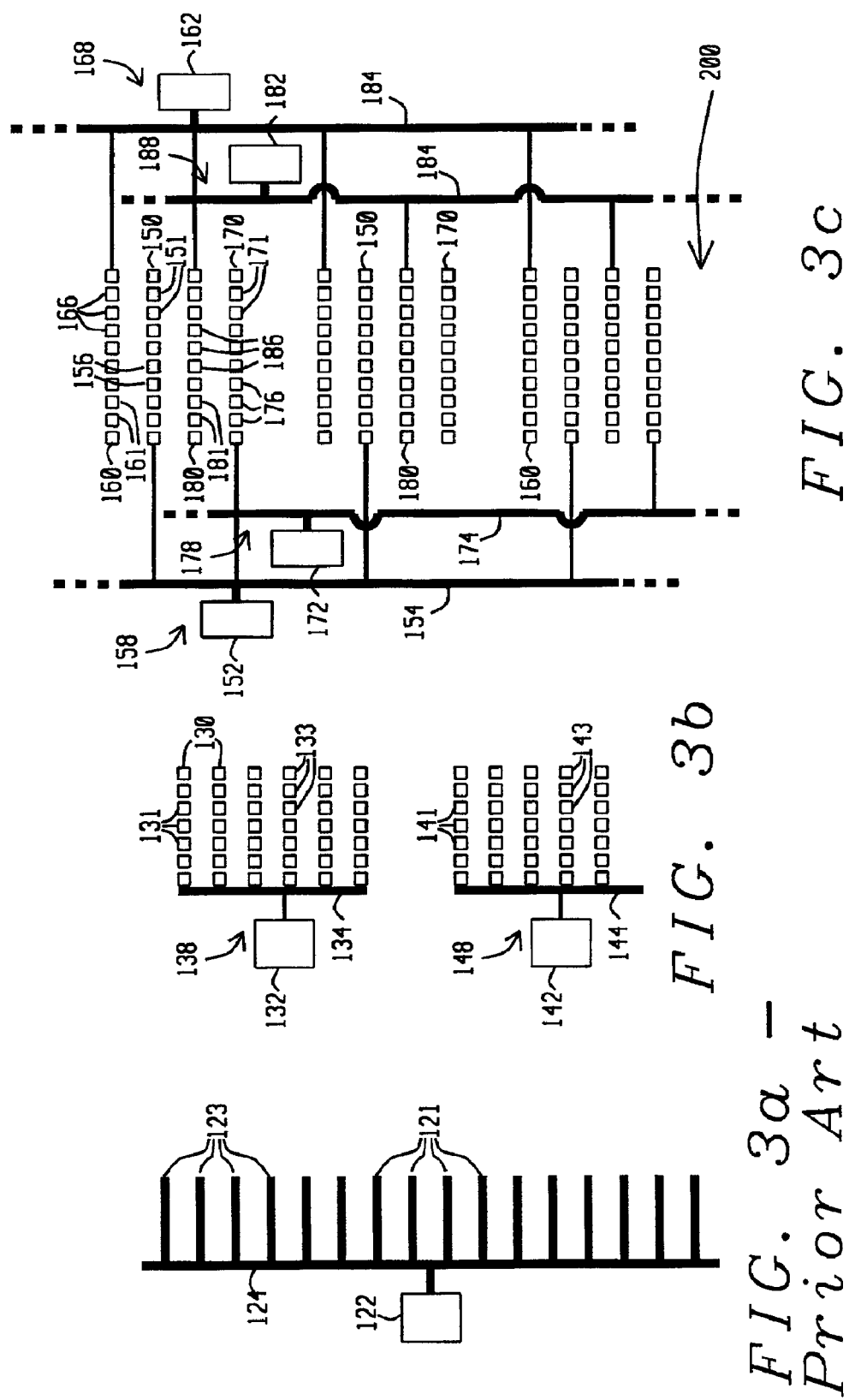

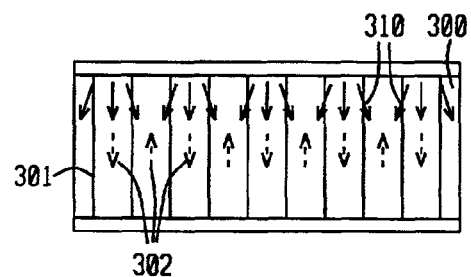
*FIG. 4a – Prior Art*
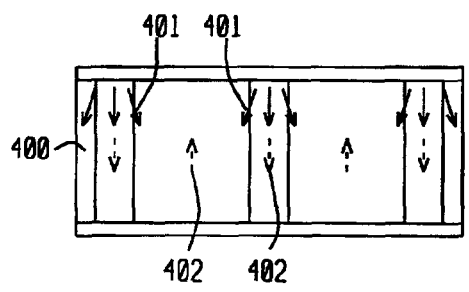
*FIG. 4b*
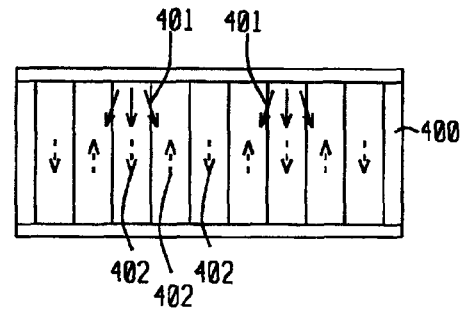
*FIG. 4c*
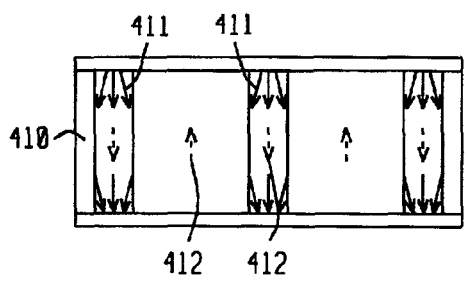
*FIG. 4d*
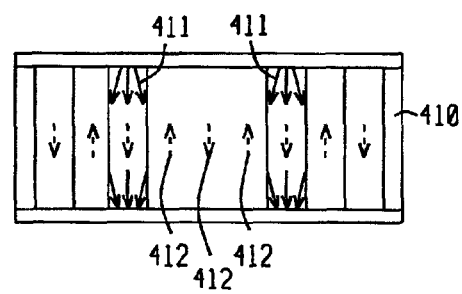
*FIG. 4e*

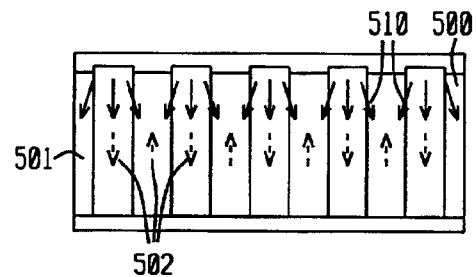
*FIG. 5a – Prior Art*
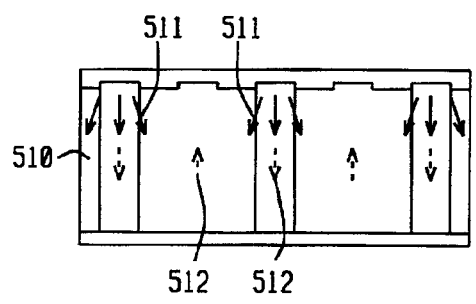
*FIG. 5b*
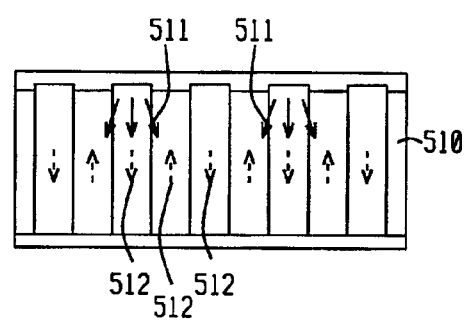
*FIG. 5c*
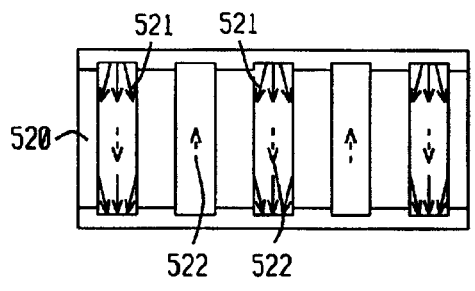
*FIG. 5d*
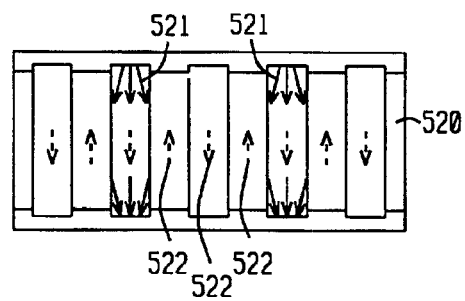
*FIG. 5e*

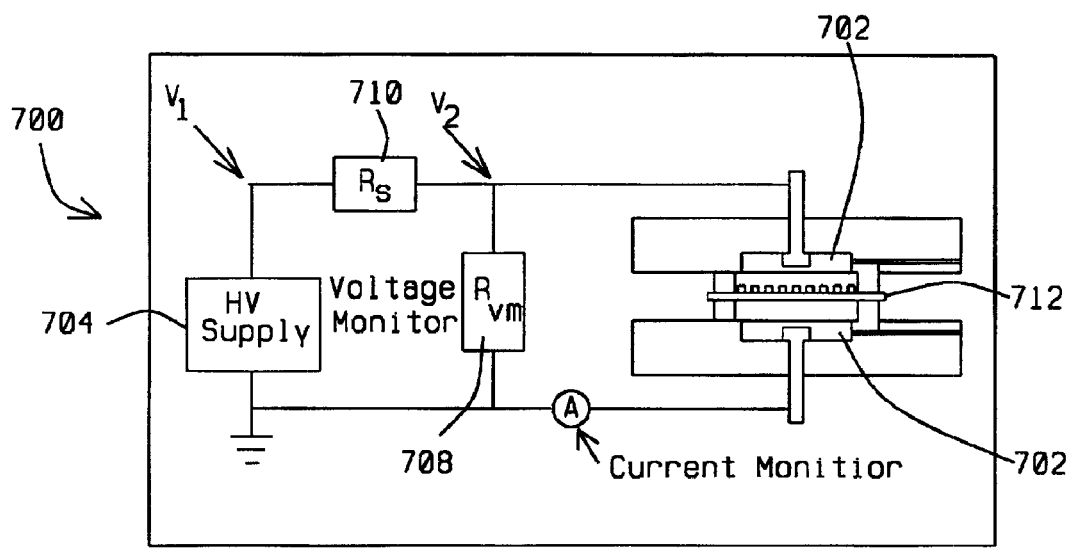
FIG. 6 — Prior Art

METHOD OF PATTERNING AND FABRICATING POLED DIELECTRIC MICROSTRUCTURES WITHIN DIELECTRIC MATERIALS

FIELD OF THE INVENTION

The present invention relates generally to the engineering of dielectric materials and more specifically to methods of patterning and fabricating poled dielectric microstructures within dielectric materials.

BACKGROUND OF THE INVENTION

Patterning and fabrication of microstructures within dielectric materials enable a new dimension in material engineering and thus opens up new opportunities for the use of dielectric materials in a variety of applications. The ability to design and process semiconductor materials for integrated circuits (IC) and semiconductor lasers is analogous to such a new dimension and opportunities now presented to dielectric materials.

The feasibility to perform microstructure engineering within dielectric materials has been shown in, for example, domain reversals of ferroelectric materials such as periodically poled lithium niobate (PPLN), periodically poled lithium tantalate (PPLT) and periodically poled $KTiOPO_4$ (PPKTP). Progress has also been shown in other materials such as poling in glass materials or poling in polymer materials.

Example applications of poled dielectric microstructures are quasi-phase-matched (QPM) nonlinear frequency conversion in dielectric materials with second order nonlinear susceptibilities. For example: (1) UV and visible light can be generated via second harmonic generation (SHG) or sum frequency generation (SFG); (2) infrared can be generated via difference frequency generation (DFG), optical parametric oscillation (OPO), optical parametric amplification (OPA) and optical parametric generation (OPG); and (3) optical frequency mixers (OFM) can be used for telecommunication and optical signal processing. Further examples include electro-optic (EO) modulators for beam scanners, sensors, high-speed modulators, etc.

One of the major factors for the realization of the above example applications depends upon the ability to patterning and fabrication of the desired microstructures within the proper materials. The prior art provides a basic patterning and fabrication approach such as ferroelectric domain reversals via electric field poling or thermal poling. However, as the desired patterned structures require finer microstructures such as shorter ferroelectric domain period or pattern structures with aperiodic periods, the challenge in achieving the desired pattern structures arises. Moreover, those methods can't necessarily be used or optimized for the fabrication of several other proper materials. In addition, those methods also might encounter the scalability and yield issues in the fabrication of large area patterned microstructures.

One of the key challenges in the poling of dielectric microstructures is the electric field and electric dipole interference within the body of dielectric materials during the electric field poling process. Such electric field and electric dipole interference results in non-uniform domain structures and difficulties in generating domain with short pitch (period). Additional challenges in poling of dielectric microstructures come from the scalability of the poling area. As the poling area increases, the total required poling time will also increase. The large ratio between the total amount of poling time for large area structures and the optimized poling time for each individual microstructure enhances the fabrication difficulty for generating large area and uniform microstructures.

Other challenges in the poling of dielectric microstructures include the generation of uniform high nucleation density (as seeding in the poling process) under high electric fields and the formation of uniform microstructures under optimized electric fields.

The article "Domain kinetics in the formation of a periodic domain structure in lithium niobate," V. Y. Shur et al., Physics of the Solid State, Vol. 41, No. 10, pages 1681–1687, October 1999, describes the experimental investigation of the evolution of the domain structure in $LiNbO_3$ with polarization switching in an electric field.

The article "Tunable ultraviolet radiation by second-harmonic generation in periodically poled lithium tantalate," J. P. Meyn et al., Optics Letters, Vol. 22, No. 16, pages 1214–1216, Aug. 15, 1997, describes electric-field poling of fine-pitch ferroelectric domain gratings in lithium tantalate and characterization of nonlinear-optical properties by single-pass quasi-phase-matched second-harmonic generation (QPM SHG).

The article "Backswitch poling in lithium niobate for high-fidelity domain patterning and efficient blue light generation," R. G. Batchko et al., Applied Physics Letters, Vol. 75, No. 12, pages 1673–1675, Sep. 20, 1999, describes an electric-field poling technique which incorporates spontaneous backswitching.

The article "Domain in ferroelectric $MgO:LiNbO_3$ by applying electric fields," A. Kuroda et al., Appl. Physics Lett., 69, pages 1565–1567, Sep. 9, 1996, describes inversion of an antiparallel ferroelectric domain in $LiNbO_3$ doped with 5 mol % MgO (MgO:LN) at room temperature by application of a step-like electric field.

The article "Bulk Periodically Poled MgO-doped LiNbO3 by External Electric Field Application," M. Nakamura et al., Jpn. J. Appl. Phys., Vol. 38, pages L512–L514, May 1, 1999, describes fabrication of bulk periodically poled MgO-doped $LiNbO_3$ (PPMgLN) crystals by an electric field poling process using a liquid electrode technique.

The article "Bulk periodically poled $MgO-LiNbO_3$ by corona discharge method," A. Harada et al., Appl. Phys. Lett., 69 (18), pages 2629–2631, Oct. 28, 1996, describes a corona discharge method of the fabrication of bulk periodically poled $MgO-LiNbO_3$ substrates.

The article "Second harmonic generation in electric poled X-cut MgO-doped $LiNbO_3$ waveguides," S. Sonoda et al., Appl. Phys. Lett., 70 (23), pages 3078–3080, Jun. 9, 1997, demonstrates that quasi-phase-matched second harmonic generation occurs in annealed proton-exchanged (APE) X-cut MgO 5 mol % doped $LiNbO_3$ (MgO:LN) waveguides supporting a TE-mode guided wave.

U.S. Pat. No. 6,156,255 to Byer et al. describes electric field domain patterning.

U.S. Pat. No. 5,193,023 to Yamada et al. describes a method of controlling the domain of a nonlinear ferroelectric optics substrate.

U.S. Pat. No. 5,519,802 to Field et al. describes a method for making devices having a pattern poled structure and pattern poled structure devices.

U.S. Pat. No. 5,991,065 to Nutt et al. describes an addressable electro-optical modulator with periodically poled domain regions.

U.S. Pat. No. 5,986,798 to Karlsson et al. describes a method and arrangement for poling of optical crystals.

U.S. Pat. No. 5,875,053 to Webjorn et al. describes periodic electric field poled crystal waveguides.

U.S. Pat. No. 5,838,702 to Byer et al. describes a method of electrically controlling regions of ferroelectric polarization domains in solid state bodies.

U.S. Pat. No. 5,786,926 to Yamada describes an electro-optical device having inverted domains formed inside a ferroelectric substrate and electro-optical unit utilizing thereof.

U.S. Pat. No. 5,756,263 to Gupta et al. describes a method of inverting ferroelectric domains by application of controlled electric field.

U.S. Pat. No. 5,654,229 to Leplingard et al. describes a method for replicating periodic nonlinear coefficient patterning during and after growth of epitaxial ferroelectric oxide films.

U.S. Pat. No. 5,652,674 to Mizuuchi et al. describes a method for manufacturing domain-inverted region, optical wavelength conversion device utilizing such domain-inverted region and method for fabricating such device.

U.S. Pat. No. 5,615,041 to Field et al. describes fabrication of patterned poled dielectric structures and devices.

U.S. Pat. No. 6,002,515 to Mizuuchi et al. describes a method for producing polarization inversion part, optical wavelength conversion element using the same, and optical waveguide.

U.S. Pat. No. 5,744,073 to Nihei et al. describes fabrication of ferroelectric domain reversals.

U.S. Pat. No. 5,668,578 to Nihei et al. describes a method for fabricating ferroelectric domain reversals, and optical wavelength converter element.

U.S. Pat. No. 5,594,746 to Harada describes a method and apparatus for fabricating ferroelectric domain reversals.

U.S. Pat. No. 5,526,173 to Yamaguchi et al. describes a method of local domain control on nonlinear optical materials.

U.S. Pat. No. 5,249,250 to Yamada et al. describes an optical device having domain structure and method for manufacturing the same.

U.S. Pat. No. 5,748,361 to Gupta et al. describes a ferroelectric crystal having inverted domain structure.

U.S. Pat. No. 5,734,772 to Gopalan et al. describes an inverted domain structure in ferroelectric crystals with polarization in the crystal plane.

SUMMARY OF THE INVENTION

Accordingly, it is an object of one or more embodiments of the present invention to provide an improved method of patterning and fabricating poled dielectric microstructures within dielectric materials.

Other objects will appear hereinafter.

It has now been discovered that the above and other objects of the present invention may be accomplished in the following manner. Specifically, a poled dielectric microstructure within a dielectric material is provided. The poled dielectric microstructure is then segmented into a plurality of independent sub-structures. The poled dielectric microstructures are then fabricated within each of the plurality of independent sub-structures. Additional processes and a novel poling setup for improving and implementing this patterning and fabrication method are also disclosed.

BRIEF DESCRIPTION OF THE DRAWINGS

The present invention will be more clearly understood from the following description taken in conjunction with the accompanying drawings in which like reference numerals designate similar or corresponding elements, regions and portions and in which:

FIGS. 1A, 2A, 3A, 4A and 5A schematically illustrate prior art for patterning and fabrication of poled dielectric microstructures.

FIG. 1B schematically illustrates a top view preferred embodiment of the present invention for patterning and fabricating poled dielectric microstructures.

FIGS. 2B and 2C schematically illustrate a top view improvement to the preferred embodiment of the present invention.

FIGS. 3B and 3C schematically illustrate a top view further improvement to the preferred embodiment of the present invention.

FIGS. 4B and 4C schematically illustrate a side-view of the present invention for simultaneously patterning electrodes on both sides of a dielectric material.

FIGS. 4D and 4E schematically illustrate an improvement to the side-view of the present invention for simultaneously patterning electrodes on both sides of a dielectric material of FIGS. 4B and 4C.

FIGS. 5B and 5C schematically illustrate an improvement to the preferred embodiment of the present invention by implementing a confinement layer in dielectric materials.

FIGS. 5D and 5E schematically illustrate a further improvement to the preferred embodiment of the present invention by the dual-side electrode patterning and by implementing a confined layer within the dielectric materials.

FIG. 6 schematically illustrates a conventional liquid contact electrode setup with which the preferred embodiment of the present invention may be achieved.

DETAILED DESCRIPTION OF THE PREFERRED EMBODIMENT

Figure 7:
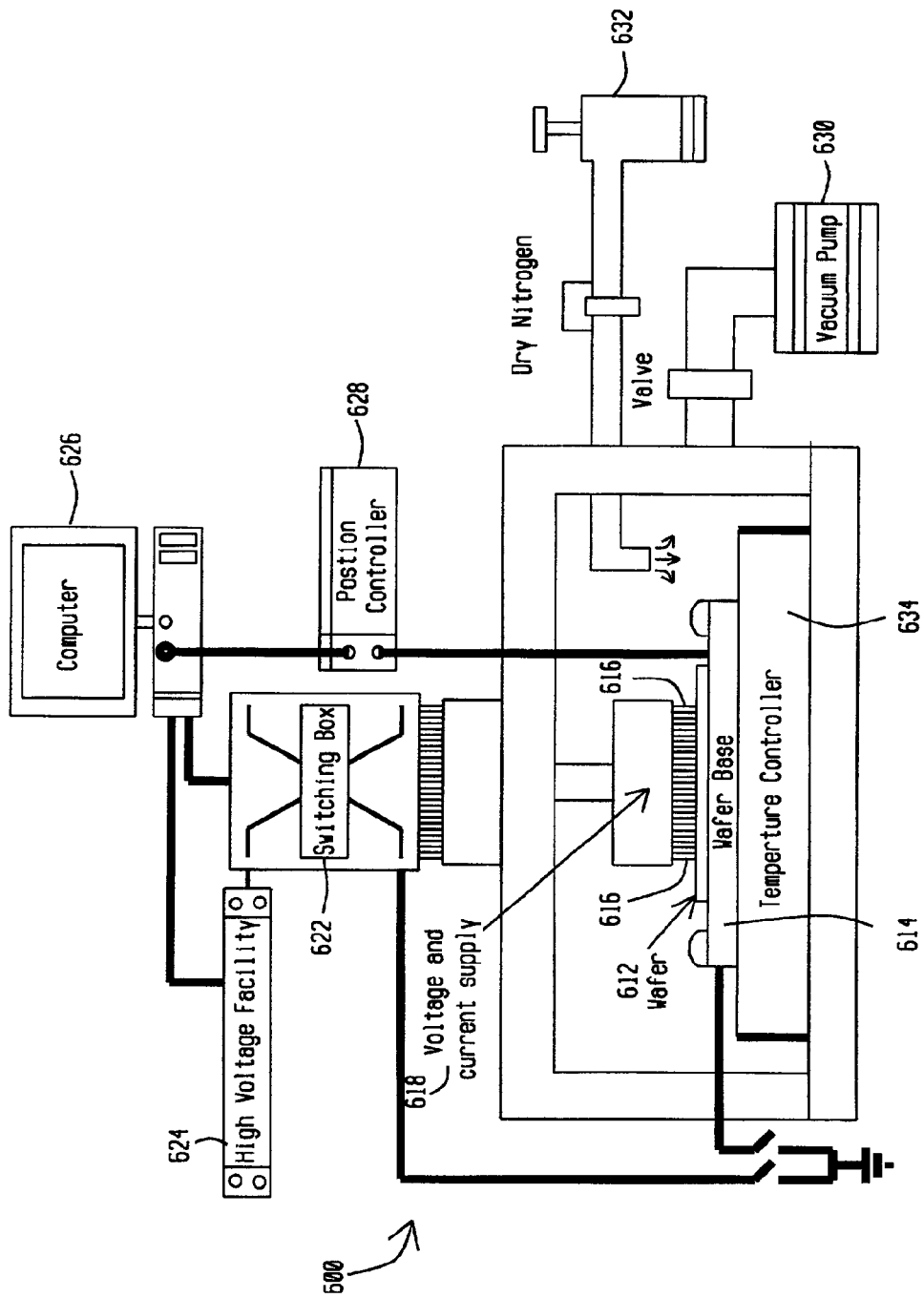
FIG. 7 schematically illustrates a novel setup with which the poling of the preferred embodiment of the present invention may be achieved.

By definition, ferroelectric materials have spontaneous polarization, i.e. they have internal dipole moments. Desired domain configurations (domains or domain patterns) within the ferroelectric may be formed by controlling the direction of these internal dipole moments. One of the more significant ways to form domain patterns is the application of an electric field to the material to change the direction of spontaneous polarization in desired regions, which is referred to as electric field poling.

This invention discloses a novel patterning and fabrication method of poled dielectric microstructures wherein the desired microstructures within a body of dielectric materials can be fabricated by segmenting the patterning into several optimized structures. This allows fabrication of poled dielectric microstructures in each independent section and thus achieves fabrication optimization. High-quality, high-yield and scaleable poled dielectric microstructures can be patterned and fabricated through this method. Additional processes and poling setups for improving and implementing this patterning and fabrication method are also disclosed.

A generic patterning and fabrication method is disclosed for poled dielectric microstructures or domains as the preferred embodiment of the present invention. Desired microstructures/domains within a body of dielectric materials are fabricated by segmenting the patterning into several optimized independent sections which permits fabrication of poled domains in each independent section and thus achieves fabrication optimization. The patterning and fabrication of poled dielectric microstructures/domains in this invention are illustrated by domain reversal within the ferroelectric materials. However, the described patterning and fabrication method can be applied to other non-ferroelectric dielectric materials such as glass materials or polymer materials.

Simply put, a dielectric material structure is provided and segmented into a plurality of independent sub-structures for patterning. The poled dielectric microstructures are then fabricated within each of the plurality of independent sub-structures. A poling station setup to achieve the optimized implementation of the proposed poling process.

Preferred Embodiment of the Present Invention

FIG. 1A illustrates a prior art 8 cm of patterned dielectric material 10 having, for example a 4 micron period. Applying an electric field to electrodes 12, (connected to an electric source 17 via a conductive line 15) each having a width 14 and a quasi-phase matched (QPM) period 16, induce individual domains 18 proximate the individual electrodes through the use of electric fields.

Undesirable electric field and electric dipole interference occurs within the body of dielectric material 10 during the poling process to form the domains 18 proximate electrodes 12. The fabrication difficulties occur especially during the challenged short period poling (for example 4-micron period) or aperiodic period poling.

FIG. 1B illustrates the preferred embodiment of the present invention. For example, the large scale 4 cm patterned dielectric material 20 (analogous to the patterned dielectric material 10 of FIG. 1A) is decomposed into two sets of electrodes 22, 24 and respective domains 26, 28 (formed by applying an electric field to respective electrodes 22, 24) each having a 8-micron poling period.

Each respective set of electrodes 22, 24 is connected to respective electrical sources 30, 32 via respective conductive lines 23, 25. Thus, the poling process only occurs for a longer period poling (8-micron), which alleviates the electric field and electric dipole interference within the body 20 of dielectric material during the poling process.

Smaller-Area Poling Patterns—FIGS. 2B and 2C

FIG. 2A schematically illustrates a prior art electrode scheme for a large scale patterned dielectric material having electrodes 40 connected to an electric source 42 via a conductive line 44.

As shown in FIGS. 2B and 2C, to further improve upon the preferred embodiment of present invention, the electrode scheme of the large scale patterned dielectric material is further divided into several subsets with smaller-area poling patterns. This will alleviate the scalability issues due to the large ratio between the total amount of poling time for large area structures (FIG. 2A) and the optimized poling time for each individual microstructures as shown in FIGS. 2B and 2C. This reduces the necessity to have good correlation of the uniform domain formation within different sections.

FIG. 2B illustrates an electrode scheme wherein the prior art electrode scheme of FIG. 2A for a large scale patterned dielectric material has been subdivided into three subsets 58, 68, 78 having smaller-area poling patterns. Each respective subset 58, 68, 78 comprises respective electrodes 50, 60, 70 connected to a respective electric source 52, 62, 72 via respective conductive lines 54, 64, 74. Respective domains 56, 66, 76 are induced proximate the individual electrodes 50, 60, 70 by applying an electric field to the respective electrodes 50, 60, 70.

FIG. 2C illustrates an electrode scheme wherein the prior art electrode scheme of FIG. 2A for a large scale patterned dielectric material 120 has been subdivided into four subsets 88, 98, 108, 118 having smaller-area poling patterns. Each respective subset 88, 98, 108, 118 comprises respective electrodes 80, 90, 100, 110 connected to a respective electric source 82, 92, 102, 112 via respective conductive lines 84, 94, 104, 114. Subsequent to the electric field poling, respective domains 81, 91, 101, 111 are induced in the dielectric material 120 proximate the respective electrodes 80, 90, 100, 110.

Enhanced Nucleation Structures—FIGS. 3B and 3C

FIG. 3A schematically illustrates a prior art electrode scheme for a large scale patterned dielectric material similar to that shown in FIG. 2A and having electrodes 121 connected to an electric source 122 via a conductive line 124. Individual domains 123 are induced by the application of an electric field to electrodes 121.

As shown in FIGS. 3B and 3C, to further enhance the uniformity of each small subset having a longer period (FIG. 1B) and/or a smaller poling area (FIGS. 2B and 2C), the local electric field intensity is enhanced to thus enhance to formation of initial poling, that is nucleation.

FIG. 3B illustrates an electrode scheme wherein the prior art electrode scheme of FIG. 3A for a large scale patterned dielectric material has been subdivided into two subsets 138, 148 having smaller-area poling patterns. Each respective subset 138, 148 comprises respective patterning electrodes 130, 140 connected to a respective electric source 132, 142 via respective conductive lines 134, 144. The patterning electrodes 130, 140 each have respective nucleation electrode design 131, 141, which enhances the local electric field intensity and thus enhances to formation of initial poling. Respective nucleated domains 133, 143 are induced proximate the individual nucleated electrode design electrodes 131, 141 by applying an electric field to the respective electrodes 131, 141.

FIG. 3C illustrates an electrode scheme wherein the prior art electrode scheme of FIG. 3A for a large scale patterned dielectric material 200 has been subdivided into four subsets 158, 168, 178, 188 having smaller-area poling patterns. Each respective subset 158, 168, 178, 188 comprises respective patterning electrodes 150, 160, 170, 180 connected to a respective electric source 152, 162, 172, 182 via respective conductive lines 154, 164, 174, 184. The patterning electrodes 150, 160, 170, 180 each have respective nucleation electrodes 151, 161, 171, 181, which enhances the local electric field intensity and thus enhances formation of initial poling. Respective nucleated domains 156, 166, 176, 186 are induced proximate the individual nucleated electrodes 150, 160, 170, 180 by applying an electric field to the respective nucleated electrodes 151, 161, 171, 181.

Application of the Present Invention to Simultaneous Electrode Patterning on Both Sides of a Dielectric Material—FIGS. 4B to 4E As shown in FIGS. 4B, 4C and FIGS. 4D, 4E, the above patterning and fabrication method of the preferred embodiment and the subset division improvement shown in FIGS. 2B and 2C and the nucleation improvement shown in FIGS. 3B and 3C can also be applied to simultaneous electrode patterning on both sides of the dielectric material to further enhance the poling quality.

FIG. 4A illustrates a prior art patterning and fabrication of poled dielectric microstructure within dielectric material 300 which has a strong electric field and electric dipole interference 310 causing non-uniformity and non-symmetric quality on both sides of the patterned dielectric material 300—Solid arrows 301 represent electric field distribution while dash arrows 302 represent dipole of ferroelectric domains.

Wherein FIGS. 4B and 4C illustrate employing the method of the present invention on a patterned dielectric material 400 which reduces the field interference with improved uniformity. Microstructures are fabricated sequentially (as illustrated in FIGS. 4B and 4C) according to the pattern segmentation. Solid arrows 401 represent electric field distribution while dash arrows 402 represent dipole of ferroelectric domains.

FIGS. 4D and 4E illustrate a further improved method of FIGS. 4B, 4C of the present invention on a patterned dielectric material 410 by simultaneously patterning electrodes on both sides of the dielectric material 410, which results in very small interference and produces uniform quality on both sides of the patterned dielectric material 410. Microstructures are fabricated sequentially (as illustrated in FIGS. 4D and 4E) according to the pattern segmentation. Solid arrows 411 represent electric field distribution while dash arrows 412 represent dipole of ferroelectric domains.

Further Improvement of this Invention by Implementing A Confined Layer within Dielectric Materials FIGS. 5B to 5E.

The above patterning and fabrication method of the preferred embodiment and the subset division improvement shown in FIGS. 2B and 2C, the nucleation improvement shown in FIGS. 3B and 3C, and the symmetry improvement shown in FIGS. 4D and 4E, can also be improved by implementing a confined layer within dielectric materials. The function of a confined layer is to alter the material properties and thus suppress the formation of poling within the confinement region. Example of confinement layer within dielectric materials can be formed by ion exchanged or ion-diffusion to dielectric materials. It has been well known that the ion-exchanged process can alter the material properties and thus will possibly suppress the formation of poling. Poled dielectric microstructures can thus be improved by engineering the ion-exchanged patterning in dielectric material, which suppress the domain formation according to the microstructure design.

FIG. 5A illustrates a prior art fabricating of poled dielectric microstructures in ion-exchanged dielectric materials 500. Solid arrows 501 represent electric field distribution while dash arrows 502 represent dipole of ferroelectric domains.

Wherein FIGS. 5B and 5C illustrate an improvement method of the present invention to the fabrication of poled dielectric microstructure within a dielectric material 510 with an ion-exchanged pattern as a domain growth confinement layer. Solid arrows 511 represent electric field distribution while dash arrows 512 represent dipole of ferroelectric domains.

FIGS. 5D and 5E illustrates a further improved method of the present invention to the fabrication of poled dielectric microstructure within a dielectric material 520 by simultaneously patterning electrodes on both sides of the dielectric materials with a confinement layer. Solid arrows 521 represent electric field distribution while dash arrows 522 represent dipole of ferroelectric domains As an example, such confinement layers within dielectric materials 510, 520 can be formed by ion exchanged or ion-diffusion to dielectric materials 510, 520.

The above-described patterning and fabrication method of the present invention can also be applied to different crystal orientation, that is X-cut, Y-cut or Z-cut.

The above-described patterning and fabrication method of the present invention can also be applied to various dielectric materials. Example ferroelectric materials include lithium niobate ($LiNbO_3$), lithium tantalate ($LiTaO_3$), $KTiOPO_4$ (KTP), $KNbO_3$ (KDP), $BaB_2O_4$ (BBO) and their family such as $MgO:LiNbO_3$, $ZnO:LiNbO_3$ etc. and material with pre-ion (proton or Ti) diffusion before poling. The $LiTaO_3$ and their family also include crystals at different formats. More preferred ferroelectric materials include $LiNbO_3$ and $LiTaO_3$ and their family such as congruent $LiNbO_3$ (CLN) and stoichiometric $LiNbO_3$ (SLN); and the above crystals with doping such as MgO:CLN, ZnO:CLN, MgO:SLN, ZnO:SLN.

Other dielectric materials include: glass materials such as $SiO_2$, $GeO_2SiO_2$, fused silica or silicate fiber; and polymer materials such as Dispersion Red 1 Side Chain polymer.

Poling Setups

FIG. 6 schematically illustrates a conventional prior art liquid contact electrode 702 poling setup 700 which may be used in accordance the practice of the present invention to electrically field pole dielectric material 712. The conventional poling setup 700 of FIG. 6 utilizes liquid contact electrodes 702 connected to a high voltage supply 704 in a circuit having a current monitor 706, a voltage monitor 708 and a resistor 710.

Novel Poling Setup 600

FIG. 7 schematically illustrates a novel poling setup 600 to electrically pole a dielectric material wafer 612 in accordance the practice of the present invention, which permits independent poling of each section. The poling setup 600 includes dielectric material wafer 612 supported by wafer base 614 and having electrodes electrically connected to voltage and current supply 618 via conductive lines 616 within vacuum chamber 620. The vacuum within chamber 620 is achieved using a vacuum pump 630 and dry nitrogen may be introduced into chamber 620 from a dry nitrogen source 632.

The voltage and current supply 618 is connected through switching box 622 to a high voltage facility 624. A computer 626 controls the electric field poling process in accordance with the method of the present invention as well as the position of wafer 612 using a position controller 628.

The voltage can preferably be applied sequentially through the pre-wired conductive lines 616 with external switching control via switching box 622/computer 626, or more preferably through moving stages to each individual sub-section contact points.

The novel poling setup 600 of FIG. 7 may also be equipped with a wafer 612 heating element 634 to adjust crystal properties of the dielectric material wafer 612 as it is well known that the material properties such as conductivity and coercive field can be changed through temperature variation of the wafer 612.

Example of Using the Method of the Present Invention With the Novel Poling Setup Patterned electrodes for fabricating dielectric material are decomposed into several subsets of electrodes. Each subset has a longer poling period and a smaller poling area as compared to the complete poled dielectric microstructures.

Improved methods as described in this invention, such as enhanced nucleation electrode design, dual side electrode patterning, and additional ion exchange in dielectric materials, can be incorporated into the patterning and fabrication processes.

Each respective set of electrodes is connected to respective electrical sources via sub-section contact points. Poling of each section is performed via connecting each conductive sub-section contact point to a high voltage facility. The voltage can preferably be applied sequentially through the pre-wired conductive lines 616 to sub-section contact points with external switching control via switching box 622/ computer 626, or more preferably through moving stages to each individual sub-section contact points.

Figure 8:
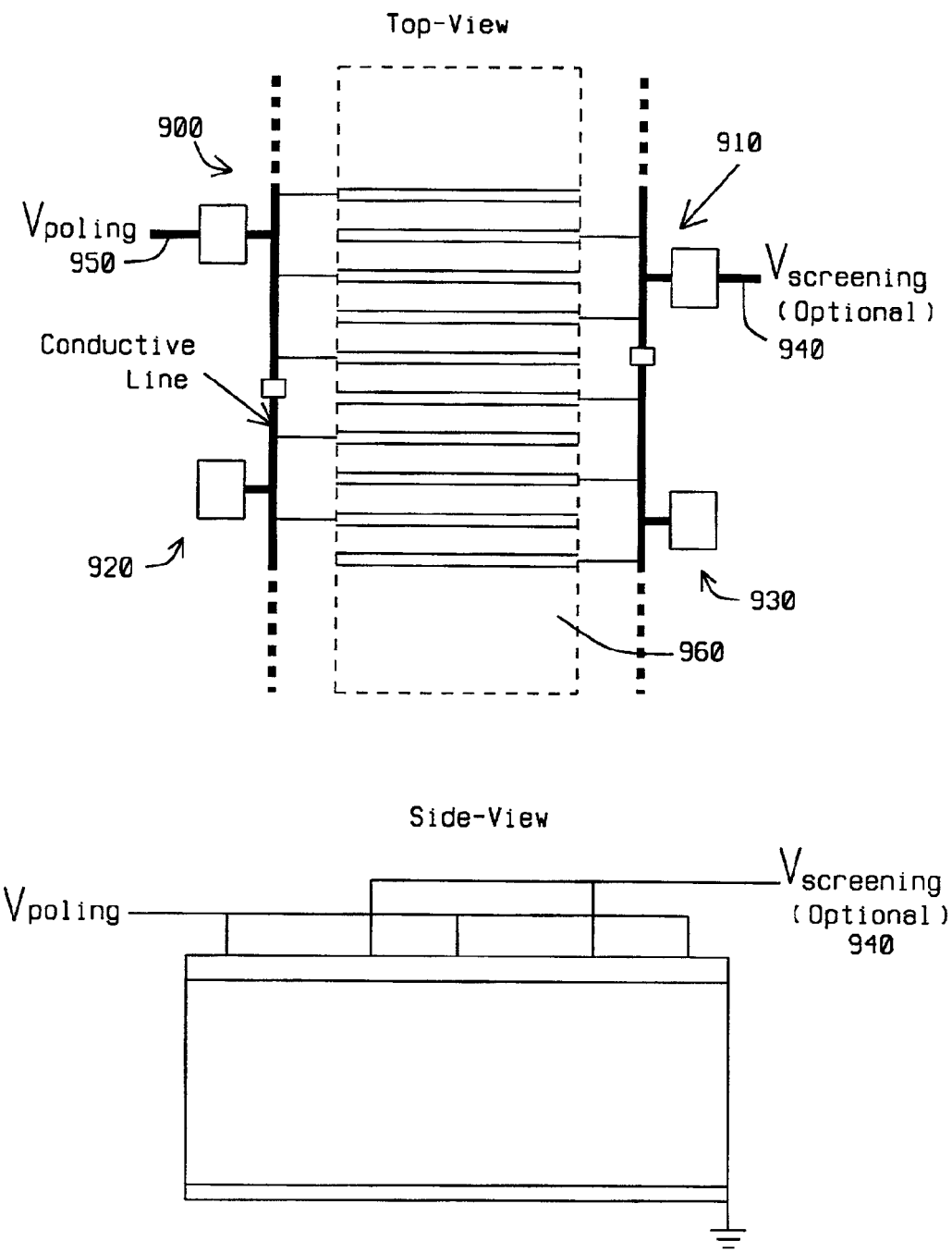
FIG. 8 schematically illustrates the implementation of present invention by the novel poling setup of FIG. 7.

FIG. 8 schematically illustrates the implementation of present invention by the novel poling setup of FIG. 7. Electrical field for poling 950 is applied to each individual section 900, 910, 920, 930 sequentially. Adjacent sections, e.g. 900, 910; 920, 930 can be applied with an additional (optional) electric field 940, which serves as a screening field to change the net electric filed distribution within the dielectric material 960.

Applications of the Poled Dielectric Microstructures/ Domains Patterned and Fabricated in Accordance with the Present Invention The applications of the poled dielectric microstructures/ domains patterned and fabricated in accordance with the present invention include:

1) quasi-phase matching (QPM) for nonlinear frequency conversion and generation of UV, visible light, infrared (IR), Q-switched and ultrashort pulses;

2) conversion process can be through second harmonic generation (SHG), sum frequency generation (SFG), difference frequency generation (DFG), optical parametric oscillation (OPO), optical parametric amplification (OPA), optical parametric generation (OPG), cascaded frequency conversion, etc.;

3) the fields of application can include a light source for laser displays, laser scanners, laser printing, laser spectroscopes, sensing and detection applications and, biology and medical applications;

4) optical frequency mixers for optical fiber communication and optical signal processing;

5) electro-optic (EO)-optic modulators for beam scanners, sensors and high-speed modulators, etc.; and 6) acoustic-optical (AO) modulators and grating assisted devices.

While particular embodiments of the present invention have been illustrated and described, it is not intended to limit the invention, except as defined by the following claims.

We claim:

1. A method of patterning and fabricating poled dielectric microstructures in a dielectric material, comprising the steps of:

provided a unitary poled dielectric microstructure within a dielectric material;

segmenting the unitary poled dielectric microstructure into a plurality of independent sub-structures; and fabricating the poled dielectric microstructures within each of the plurality of independent sub-structures; wherein the patterned and fabricated poled dielectric microstructures are enhanced nucleated.

2. The method of claim 1, wherein the dielectric material is comprised of ferroelectric materials, glass materials or polymer materials.

3. The method of claim 1, wherein the dieledric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica, silicate fiber or Dispersion Red 1 Side Chain polymer.

4. The method of claim 1, wherein the dielectric material is comprised of $LiNbO_3$, $LiTaO_3$, congruent $LiNbO_3$(CLN), stoichiometric $LiNbO_3$(SLN), MgO:CLN, ZnO:CLN, MgO:SLN or ZnO:SLN.

5. The method of claim 1 wherein the plurality of independent sub-structures have larger periods than the unitary poled dielectric microstructure.

6. The method of claim 1, wherein the plurality of independent sub-structures have smaller-area poling patterns than the unitary poled dielectric microstructure.

7. The method of claim 1, wherein the plurality of independent sub-structures have larger periods and smaller-area poling patterns than the unitary poled dielectric microstructure.

8. The method of claim 1, wherein the poled dielectric microstructures are formed on both sides of the dielectric material.

9. The method of claim 1, wherein the dielectric material has a crystal orientation that is X-cut, Y-cut or Z-cut.

10. The method of claim 1, wherein the poled dielectric microstructures may be fabricated using liquid contact electrodes.

11. The method of claim 1, wherein the poled dielectric microstructures may be fabricated by sequentially applying voltage through pre-wired conductive lines.

12. The method of claim 1, wherein the poled dielectric microstructures may be fabricated by applying voltage through moving stages to contact points for each independent sub-structure.

13. The method of claim 1, wherein the dielectric material has crystal properties that are adjusted through temperature variations of the dielectric material during fabrication of the poled dielectric microstructures.

14. The method of claim 1, wherein the fabricated poled dielectric microstructures may be utilized in a:

1) quasi-phase matching (QPM) for nonlinear frequency conversion or generation of UV, visible light, infrared (IR), Q-switched pulses or ultrashort pulses;

2) conversion processes through second harmonic generation (SHG), sum frequency generation (SFG), difference frequency generation (DFG), optical parametric oscillation (OPO), optical parametric amplification (OPA), optical parametric generation (OPG) or cascaded frequency conversion;

3) a light source for laser displays, laser scanners, laser printing, laser spectroscopes, sensing or detection applications or biology or medical applications;

4) optical frequency mixers for optical fiber communication or optical signal processing, 5) electro-optic (EO) modulators for beam scanners, sensors or high-speed modulators; or 6) acoustic-optical (AO) modulators or grating assisted devices manner.

15. The method of claim 1; wherein the dielectric material includes at least one confinement layer; the at least one confinement layer including an ion-exchanged pattern as a domain growth confinement layer.

16. The method of claim 1, wherein the dielectric material is comprised of ferroelectric materials or polymer materials.

17. The method of claim 1, wherein the dielectric material is comprised of ferroelectric materials.

18. The method of claim 1, wherein the dieledric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica or silicate fiber.

19. A method of patterning and fabricating poled dielectric microstructures in dielectric materials, comprising the steps of:

providing a unitary poled dieledric microstructure within a dielectric material; wherein the dielectric material is comprised of ferroelectric materials, glass materials or polymer materials;

segmenting the unitary poled dielectric microstructure into a plurality of independent sub-structures; and fabricating the poled dielectric microstructures within each of the plurality of independent sub-structures; wherein the patterned and fabricated poled dielectric microstructures are enhanced nucleated.

20. The method of claim 19, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica, silicate fiber or Dispersion Red 1 Side Chain polymer.

21. The method of claim 19, wherein the dielectric material is comprised of a $LiNbO_3$, $LiTaO_3$, congruent $LiNbO_3$, (CLN), stoichiometric $LiNbO_3$(SLN), MgO:CLN, ZnO:CLN, MgO:SLN or ZnO:SLN.

22. The method of claim 19, wherein the plurality of independent sub-structures have larger periods than the unitary poled dielectric microstructure.

23. The method of claim 19, wherein the plurality of independent sub-structures have smaller-area poling patterns than the unitary poled dielectric microstructure.

24. The method of claim 19, wherein the plurality of independent sub-structures have larger periods and smaller-area poling patterns than the unitary poled dielectric microstructure.

25. The method of claim 19, wherein the poled dielectric microstructures are formed on both sides of the dielectric material.

26. The method of claim 19, wherein the dielectric material has a crystal orientation that is X-cut, Y-cut or Z-cut.

27. The method of claim 19, wherein the poled dielectric microstructures may be fabricated using liquid contact electrodes.

28. The method of claim 19, wherein the poled dielectric microstructures may be fabricated by sequentially applying voltage through pre-wired conductive lines.

29. The method of claim 19, wherein the poled dielectric microstructures may be fabricated by applying voltage through moving stages to contact points for each independent sub-structure.

30. The method of claim 19, wherein the dielectric material has crystal properties that are adjusted through temperature variations of the dielectric material during fabrication of the poled dielectric microstructures.

31. The method of claim 19, wherein the fabricated poled dielectric microstructures may be utilized in a:
1) quasi-phase matching (QPM) for nonlinear frequency conversion or generation of UV, visible light, infrared (IR), Q-switched pulses or ultrashort pulses;
2) conversion processes through second harmonic generation (SHG), sum frequency generation (SFG), difference frequency generation (DFG), optical parametric oscillation (OPO), optical parametric amplification (OPA), optical parametric generation (OPG) or cascaded frequency conversion;
3) a light source for laser displays, laser scanners, laser printing, laser spectroscopes, sensing or detection applications or biology or medical applications;
4) optical frequency mixers for optical fiber communication or optical signal processing;
5) electro-optic (EO) modulators for beam scanners, sensors or high-speed modulators; or
6) acoustic-optical (AO) modulators and grating assisted devices manner.

32. The method of claim 19; wherein the dielectric material includes at least one confinement layer; the at least one confinement layer including an ion-exchanged pattern as a domain growth confinement layer.

33. The method of claim 19, wherein the dielectric material is comprised of ferroelectric materials or polymer materials.

34. The method of claim 19, wherein the dielectric material is comprised of ferroelectric materials.

35. The method of claim 19, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica or silicate fiber.

36. A method of patterning and fabricating poled dielectric microstructures in dielectric materials, comprising the steps of:
providing a unitary poled dielectric microstructure within a dielectric material; the dielectric material having a crystal orientation that is X-cut, Y-cut or cut; and the dielectric material being comprised of ferroelectric materials, glass materials or polymer materials;
segmenting the unitary poled dielectric microstructure into a plurality of independent sub-structures; and
fabricating the poled dielectric microstructures within each of the plurality of independent sub-structures; wherein the patterned and fabricated poled dielectric microstructures are enhanced nucleated.

37. The method of claim 36, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica, silicate fiber or Dispersion Red 1 Side Chain polymer.

38. The method of claim 36, wherein the dielectric material is comprised of $LiNbO_3$, $LiTaO_3$, $LiNbO_3$(CLN), stoichiometric $LiNbO_3$(SLN), MgO:CLN, ZnO:CLN, MgO:SLN or ZnO:SLN.

39. The method of claim 36, wherein the plurality of independent sub-structures have larger periods than the unitary poled dielectric microstructure.

40. The method of claim 36, wherein the plurality of independent sub-structures have smaller-area poling patterns than the unitary poled dielectric microstructure.

41. The method of claim 36, wherein the plurality of independent sub-structures have larger periods and smaller-area poling patterns than the unitary poled dielectric microstructure.

42. The method of claim 36, wherein the poled dielectric microstructures are formed on both sides of the dielectric material.

43. The method of claim 36, wherein the poled dielectric microstructures may be fabricated using liquid contact electrodes.

44. The method of claim 36, wherein the poled dielectric microstructures may be fabricated by sequentially applying voltage through pre-wired conductive lines.

45. The method of claim 36, wherein the poled dielectric microstructures may be fabricated by applying voltage through moving stages to contact points for each independent sub-structure.

46. The method of claim 36, wherein the dielectric material has crystal properties that are adjusted through temperature variations of the dielectric material during fabrication of the poled dielectric microstructures.

47. The method of claim 36, wherein the fabricated poled dielectric microstructures may be utilized in a:
1) quasi-phase matching (QPM) for nonlinear frequency conversion or generation of UV, visible light, infrared (IR), Q-switched pulses or ultrashort pulses;
2) conversion processes through second harmonic generation (SHG), sum frequency generation (SFG), difference frequency generation (DFG), optical parametric oscillation (OPO), optical parametric amplification (OPA), optical parametric generation (OPG) or cascaded frequency conversion;

3) a light source for laser displays, laser scanners, laser printing, laser spectroscopes, sensing or detection applications or biology or medical applications;

4) optical frequency mixers for optical fiber communication or optical signal processing;

5) electro-optic (EO) optic modulators for beam scanners, sensors or high-speed modulators; or 6) acoustic-optical (AO) modulators or grating assisted devices manner.

48. The method of claim 36, wherein the dieledric material includes at least one confinement layer; the at least one confinement layer including an ion-exchanged pattern as a domain growth confinement layer.

49. The method of claim 36, wherein the dielectric material is comprised of ferroelectric materials or polymer materials.

50. The method of claim 36, wherein the dielectric material is comprised of ferroelectric materials.

51. The method of claim 36, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica or silicate fiber.

52. A poling setup to electrically pole a dielectric material wafer, comprising:
the dielectric material wafer disposed within a vacuum chamber on a wafer base;
the wafer base being connected to a position controller for controlling the position of the wafer base;
patterned electrodes disposed proximate the dielectric material wafer; the patterned electrodes being divided into two or more electrode subsets;
a voltage and current supply connected to the patterned electrodes by conductive lines;
a high voltage facility connected to the voltage and current supply by a switching box; and
a central processing unit (CPU) electrically connected to, and controlling, the high voltage facility, the switching box and the position controller.

53. The poling setup of claim 52, further including a vacuum pump connected to the vacuum chamber.

54. The poling to setup of 52, further including a source of dry nitrogen connected to the vacuum chamber.

55. The poling setup of claim 52, further including a vacuum pump connected to the vacuum chamber, and a source of dry nitrogen connected to the vacuum chamber.

56. The poling setup of claim 52, further including a wafer heating element connected to the wafer base.

57. A method of patterning and fabricating poled dielectric microstructures in a dielectric material, comprising the steps of:
providing a unitary poled dielectric microstructure within a dielectric material;
segmenting the unitary poled dielectric microstructure into a plurality of independent sub-structures; and
fabricating the poled dielectric microstructures within each of the plurality of independent sub-structures;
wherein the dielectric material has crystal properties that are adjusted through temperature variations of the dielectric material during fabrication of the poled dielectric microstructures.

58. The of method 57, wherein the dielectric material is comprised of ferroelectric materials, glass materials or polymer materials.

59. The method of claim 57, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica, silicate fiber or Dispersion Red 1 Side Chain polymer.

60. The method of claim 57, wherein the dielectric material is comprised of $LiNbO_3$, $LiTaO_3$, congruent $LiNbO_3$(CLN), stoichiometric $LiNbO_3$(SLN), MgO:CLN, ZnO:CLN, MgO:SLN or ZnO:SLN.

61. The method of claim 57, wherein the plurality of independent sub-structures have larger periods than the unitary poled dielectric microstructure.

62. The method of claim 57, wherein the plurality of independent sub-structures have smaller-area poling patterns than the unitary poled dielectric microstructure.

63. The method of claim 57, wherein the patterned and fabricated poled dielectric microstructures are enhanced nucleated.

64. The method of claim 57, wherein the plurality of independent sub-structures have larger periods and smaller-area poling patterns than the unitary poled dielectric microstructure.

65. The method of claim 57, wherein the plurality of independent sub-structures have larger periods and smaller-area poling patterns than the unitary poled dielectric microstructure and the patterned and fabricated poled dielectric microstructure are enhanced nucleated.

66. The method of claim 57, wherein the plurality of independent sub-structures have larger periods than the unitary poled dielectric microstructure and the patterned and fabricated poled dielectric microstructures are enhanced nucleated.

67. The method of claim 57, wherein the plurality of independent sub-structures have smaller-area poling patterns than the unitary poled dielectric microstructure and the patterned and fabricated poled dielectric microstructures are enhanced nucleated.

68. The method of claim 57, wherein the poled dielectric microstructures are formed on both sides of the dielectric material.

69. The method of claim 57, wherein the dielectric material has a crystal orientation that is X-cut, Y-cut or Z-cut.

70. The method of claim 57, wherein the poled dielectric microstructures may be fabricated using liquid contact electrodes.

71. The method of claim 57, wherein the poled dielectric microstructures may be fabricated by sequentially applying voltage through pre-wired conductive lines.

72. The method of claim 57, wherein the poled dielectric microstructures may be fabricated by applying voltage through moving stages to contact points for each independent sub-structure.

73. The method of claim 57, wherein the fabricated poled dielectric microstructures may be utilized in a:
1) quasi-phase matching (QPM) for nonlinear frequency conversion or generation of UV, visible light, infrared (IR), Q-switched pulses or ultrashort pulses;
2) conversion processes through second harmonic generation (SHG), sum frequency generation (SFG), difference frequency generation (DFG), optical parametric oscillation (OPO), optical parametric amplification (OPA), optical parametric generation (OPG) or cascaded frequency conversion;
3) a light source for laser displays, laser scanners, laser printing, laser spectroscopes, sensing or detection applications or biology or medical applications;

4) optical frequency mixers for optical fiber communication or optical signal processing;

5) electro-optic (ED) modulators for beam scanners, sensors or high-speed modulators; or 6) acoustic-optical (AD) modulators or grating assisted devices manner.

74. The method of claim 57, wherein the dielectric material is comprised of ferroelectric materials or polymer materials.

75. The method of claim 57, wherein the dielectric material is comprised of ferroelectric materials.

76. The method of claim 57, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica or silicate fiber.

77. The method of claim 57, wherein the dielectric material includes at least one confinement layer; the at least one confinement layer including an ion-exchanged pattern as a domain growth confinement layer.

78. A method of patterning and fabricating poled dielectric microstructures in dielectric materials, comprising the steps of providing a unitary poled dielectric microstructure within a dielectric material; wherein the dielectric material is comprised of ferroelectric materials, glass materials or polymer materials;

segmenting the unitary poled dielectric microstructure into a plurality of independent sub-structures; and fabricating the poled dielectric microstructures within each of the plurality of independent sub-structures; wherein the dielectric material has crystal properties that are adjusted through temperature variations of the dieledric material during fabrication of the poled dielectric microstructures.

79. The method of claim 78, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica, silicate fiber or Dispersion Red 1 Side Chain polymer.

80. The method of claim 78, wherein the dielectric material is comprised of a $LiNbO_3$, $LiTaO_3$, congruent $LiNbO_3$, (CLN), stoichiometric $LiNbO_3$(SLN), MgO:CLN, ZnO:CLN, MgO:SLN or ZnO:SLN.

81. The method of claim 78, wherein the plurality of independent sub-structures have larger periods than the unitary poled dielectric microstructure.

82. The method of claim 78, wherein the plurality of independent sub-structures have smaller-area poling patterns than the unitary poled dielectric microstructure.

83. The method of claim 78, wherein the patterned and fabricated poled dielectric microstructures are enhanced nucleated.

84. The method of claim 78, wherein the plurality of independent sub-structures have larger periods and smaller-area poling patterns than the unitary poled dielectric microstructure.

85. The method of claim 78, wherein the plurality of independent sub-structures have larger periods and smaller-area poling patterns than the unitary poled dielectric microstructure and the patterned and fabricated poled dielectric microstructures are enhanced nucleated.

86. The method of claim 78, wherein the plurality of independent sub-structures have larger periods than the unitary poled dielectric microstructure and the patterned and fabricated poled dielectric microstructures are enhanced nucleated.

87. The method of claim 78, wherein the plurality of independent sub-structures have smaller-area poling patterns than the unitary poled dielectric microstructure and the patterned and fabricated poled dielectric microstructures are enhanced nucleated.

88. The method of claim 78, wherein the poled dielectric microstructures are formed on both sides of the dielectric material.

89. The method of claim 78, wherein the dielectric material has a crystal orientation that is X-cut, Y-cut or Z-cut.

90. The method of claim 78, wherein the poled dielectric microstructures may be fabricated using liquid contact electrodes.

91. The method of claim 78, wherein the poled dielectric microstructures may be fabricated by sequentially applying voltage through pre-wired conductive lines.

92. The method of claim 78, wherein the poled dielectric microstructures may be fabricated by applying voltage through moving stages to contact points for each independent sub-structure.

93. The method of claim 78, wherein the fabricated poled dielectric microstructures may be utilized in a:

1) quasi-phase matching (QPM) for nonlinear frequency conversion or generation of UV, visible light, infrared (IR), Q-switched pulses or ultrashort pulses;

2) conversion processes through second harmonic generation (SHG), sum frequency generation (SFG), difference frequency generation (DFG), optical parametric oscillation (OPO), optical parametric amplification (OPA), optical parametric generation (OPG) or cascaded frequency conversion;

3) a light source for laser displays, laser scanners, laser printing, laser spectroscopes, sensing or detection applications or biology or medical applications;

4) optical frequency mixers for optical fiber communication or optical signal processing 5) electro-optic (EO) modulators for beam scanners, sensors or high-speed modulators; or 6) acoustic-optical (AG) modulators or grating assisted devices manner.

94. The method of claim 78, wherein the dielectric material is comprised of ferroelectric materials or polymer materials.

95. The method of claim 78, wherein the dielectric material is comprised of ferroelectric materials.

96. The method of claim 78, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica or silicate fiber.

97. The method of claim 78, wherein the dielectric material includes at least one confinement layer; the at least one confinement layer including an ion-exchanged pattern as a domain growth confinement layer.

98. A method of patterning and fabricating poled dielectric microstructures in dielectric materials, comprising the steps of:

providing a unitary poled dielectric microstructure within a dielectric material; the dielectric material having a crystal orientation that is X-cut, Y-cut or Z-cut; and the dielectric material being comprised of ferroelectric materials, glass materials or polymer materials;

segmenting the unitary poled dielectric microstructure into a plurality of independent sub-structures; and fabricating the poled dielectric microstructures within each of the plurality of independent sub-structures;

wherein the dielectric material has crystal properties that are adjusted through temperature variations of the dielectric material during fabrication of the poled dielectric microstructures.

99. The method of claim 98, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica, silicate fiber or Dispersion Red 1 Side Chain polymer.

100. The method of claim 98, wherein the dielectric material is comprised of $LiNbO_3$, $LiTaO_3$, $LiNbO_3(CLN)$, stoichiometric $LiNbO_3(SLN)$, MgO:CLN, ZnO:CLN, MgO:SLN or ZnO:SLN.

101. The method of claim 98, wherein the plurality of independent sub-structures have larger periods than the unitary poled dielectric microstructure.

102. The method of claim 98, wherein the plurality of independent sub-structures have smaller-area poling patterns than the unitary poled dielectric microstructure.

103. The method of claim 98, wherein the patterned and fabricated poled dielectric microstructures are enhanced nucleated.

104. The method of claim 98, wherein the plurality of independent sub-structures have larger periods and smaller-area poling patterns than the unitary poled dielectric microstructure.

105. The method of claim 98, wherein the plurality of independent sub-structures have larger periods and smaller-area poling patterns than the unitary poled material microstructure and the patterned and fabricated poled dielectric microstructures are enhanced nucleated.

106. The method of claim 98, wherein the plurality of independent sub-structures have larger periods than the unitary poled dielectric microstructure and the patterned and fabricated poled dielectric microstructures are enhanced nucleated.

107. The method of claim 98, wherein the plurality of independent sub-structures have smaller-area poling patterns than the unitary poled dielectric microstructure and the patterned and fabricated poled dielectric microstructures are enhanced nucleated.

108. The method of claim 98, wherein the poled dielectric microstructures are formed on both sides of the dielectric material.

109. The method of claim 98, wherein the poled dielectric microstructures may be fabricated using liquid contact electrodes.

110. The method of claim 98, wherein the poled dielectric microstructures may be fabricated by sequentially applying voltage through pre-wired conductive lines.

111. The method of claim 98, wherein the poled dielectric microstructures may be fabricated by applying voltage through moving stages to contact points for each independent sub-structure.

112. The method of claim 98, wherein the fabricated poled dielectric microstructures may be utilized in a:
  1) quasi-phase matching (QPM) for nonlinear frequency conversion or generation of UV, visible light, infrared (IR), Q-switched pulses or ultrashort pulses;
  2) conversion processes through second harmonic generation (SHG), sum frequency generation (SFG), difference frequency generation (DFG), optical parametric oscillation (OPO), optical parametric amplification (OPA), optical parametric generation (OPG) or cascaded frequency conversion;
  3) a light source for laser displays, laser scanners, laser printing, laser spectroscopes, sensing or detection applications or biology or medical applications;
  4) optical frequency mixers for optical fiber communication or optical signal processing;
  5) electro-optic (EO) optic modulators for beam scanners, sensors or high-speed modulators; or
  6) acoustic-optical (AO) modulators and grating assisted devices manner.

113. The method of claim 98, wherein the dielectric material is comprised of ferroelectric materials or polymer materials.

114. The method of claim 98, wherein the dielectric material is comprised of ferroelectric materials.

115. The method of claim 98, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica or silicate fiber.

116. The method of claim 98, wherein the dielectric material includes at least one confinement layer; the at least one confinement layer including an ion-exchanged pattern as a domain growth confinement layer.

117. Poled dielectric microstructure structures, comprising:
  a dielectric material; and
  a unitary poled dielectric microstructure segmented into a plurality of enhanced nucleated independent sub-structures in the dielectric material; the poled dielectric microstructure structures being within each of the plurality of enhanced nucleated independent sub-structures.

118. The structures of claim 117, wherein the dielectric material is comprised of ferroelectric materials, glass materials or polymer materials.

119. The structures of claim 117, wherein the dielectric material is comprised of $LiNbO_3$, $LiTaO_3$, $KTiOPO_4$, $KNbO_3$, $BaB_2O_4$, $ZnO:LiNbO_3$, $SiO_2$, $GeO_2SiO_2$, fused silica, silicate fiber or Dispersion Red 1 Side Chain polymer.

120. The structures of claim 117, wherein the dielectric material is comprised of $LiNbO_3$, $LiTaO_3$, $KTiOPO_4$, $KNbO_3$, $BaB_2O_4$, $ZnO:LiNbO_3$, $SiO_2$, $GeO_2SiO_2$, fused silica or silicate fiber.

121. The structures of claim 117, wherein the dielectric material is comprised of $LiNbO_3$, $LiTaO_3$, congruent $LiNbO_3(CLN)$, stoichiometric $LiNbO_3(SLN)$, MgO:CLN, ZnO:CLN, MgO:SLN or ZnO:SLN.

122. The structures of claim 117, wherein the plurality of independent sub-structures have larger periods than the unitary poled dielectric microstructure.

123. The structures of claim 117, wherein the plurality of independent sub-structures have smaller-area poling patterns than the unitary poled dielectric microstructure.

124. The structures of claim 117, wherein the plurality of independent sub-structures have larger periods and smaller-area poling patterns than the unitary poled dielectric microstructure.

125. The structures of claim 117, wherein the poled dielectric microstructure structures are formed on both sides of the dielectric material.

126. The structures of claim 117, wherein the dielectric material has a crystal orientation that is X-cut, Y-cut or Z-cut.

127. The structures of claim 117, wherein the dielectric material has adjusted crystal properties.

128. The structures of claim 117, wherein the poled dielectric microstructure structures are utilized in a:
  1) quasi-phase matching (QPM) for nonlinear frequency conversion or generation of UV, visible light, infrared (IR), Q-switched and ultrashort pulses manner;

2) conversion processes through second harmonic generation (SHG), sum frequency generation (SFG), difference frequency generation (DFG), optical parametric oscillation (OPO), optical parametric amplification (OPA), optical parametric generation (OPG) or cascaded frequency conversion manner 3) a light source for laser displays, laser scanners, laser printing, laser spectroscopes, sensing or detection applications or biology or medical applications manner;

4) optical frequency mixers for optical fiber communication and optical signal processing manner;

5) electro-optic (EO) modulators for beam scanners, sensors and high-speed modulators manner; or 6) acoustic-optical (AO) modulators and grating assisted devices manner.

129. The structures of claim 117, wherein the dielectric material includes at least one confinement layer; the at least one confinement layer including an ion-exchanged pattern as a domain growth confinement layer.

130. The structures of claim 117, wherein the dielectric material is comprised of ferroelectric materials or polymer materials.

131. The structures of claim 117, wherein the dielectric material is comprised of ferroelectric materials.

132. Poled dielectric microstructure structures, comprising:
a dielectric material having adjusted crystal properties through temperature variations of the dielectric material; and
a unitary poled dielectric microstructure segmented into a plurality of independent sub-structures in the dielectric material; the poled dielectric microstructure structures being within each of the plurality of independent sub-structures.

133. The structure of claim 132, wherein the dielectric material is comprised of ferroelectric materials, glass materials or polymer materials.

134. The structure of claim 132, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica, silicate fiber or Dispersion Red 1 Side Chain polymer.

135. The structure of claim 132, wherein the dielectric material is comprised of $LiNbO_3$, $LiTaO_3$, $KTiOPO_4$, $KNbO_3$, $BaB_2O_4$, $MgO:LiNbO_3$, $ZnO:LiNbO_3$, $SiO_2$, $GeO_2SiO_2$, fused silica or silicate fiber.

136. The structure of claim 132, wherein the dielectric material is comprised of $LiNbO_3$. $LiTaO_3$, congruent $LiNbO_3$(CLN), stoichiometric $LiNbO_3$(SLN), MgO:CLN, ZnO:CLN, MgO:SLN or ZnO:SLN.

137. The structure of claim 132, wherein the plurality of independent sub-structures have larger periods than the unitary poled dielectric microstructure. dielectric microstructure.

138. The structure of claim 132, wherein the plurality of independent sub-structures are enhanced nucleated.

139. The structure of claim 132, wherein the plurality of independent sub-structures have larger periods and smaller-area poling patterns than the unitary poled dielectric microstructure.

140. The structure of claim 132, wherein the plurality of independent sub-structures have larger periods and smaller-area poling patterns than the unitary poled dielectric microstructure and the plurality of independent sub-structures are enhanced nucleated.

141. The structure of claim 132, wherein the plurality of independent sub-structures have larger periods than the unitary poled dielectric microstructure and the plurality of independent sub-structures are enhanced nucleated.

142. The structure of claim 132, wherein the prurality of independent sub-structures have larger periods than the poled dielectric microstructure and the prurality of independent sub-structures are enhanced nucleated.

143. The structure of claim 132, wherein the plurality of independent sub-structures have smaller-area poling patterns than the unitary poled dielectric microstructure, and the plurality of independent sub-structures are enhanced nucleated.

144. The structure of claim 132, wherein the poled dielectric microstructure structures are formed on both sides of the dielectric material.

145. The structure of claim 132, wherein the dielectric material has a crystal orientation that is X-cut, Y-cut or Z-cut.

146. The structure of claim 132, wherein the fabricated poled dielectric microstructure structures may be utilized in a:

1) quasi-phase matching (QPM) for nonlinear frequency conversion or generation of UV, visible light, infrared (IR), Q-switched pulses or ultrashort pulses;

2) conversion processes through second harmonic generation (SHG), sum frequency generation (SFG), difference frequency generation (DFG), optical parametric oscillation (OPO), optical parametric amplification (OPA), optical parametric generation (OPG) or cascaded frequency conversion;

3) a light source for laser displays, laser scanners, laser printing, laser spectroscopes, sensing or detection applications or biology or medical applications;

4) optical frequency mixers for optical fiber communication or optical signal processing, 5) electro-optic (EO) modulators for beam scanners, sensors or high-speed modulators; or 6) acoustic-optical (AO) modulators or grating assisted devices manner.

147. The structure of claim 132, wherein the dielectric material is comprised of ferroelectric materials or polymer materials.

148. The structure of claim 132, wherein the dielectric material is comprised of ferroelectric materials.

149. The structure of claim 132, wherein the dielectric material includes at least one confinement layer; the at least one confinement layer including an ion-exchanged pattern as a domain growth confinement layer.

* * * * *